June 26, 1951 C. P. ROSS 2,558,002

VOLUME COMPRESSION SYSTEM

Filed Jan. 25, 1947 2 Sheets-Sheet 1

INVENTOR
COLIN P. ROSS
BY Robert Harding Jr.
ATTORNEY

June 26, 1951 C. P. ROSS 2,558,002

VOLUME COMPRESSION SYSTEM

Filed Jan. 25, 1947 2 Sheets-Sheet 2

INVENTOR
COLIN P. ROSS

BY Robert Harding Jr.
ATTORNEY

Patented June 26, 1951

2,558,002

UNITED STATES PATENT OFFICE 2,558,002

VOLUME COMPRESSION SYSTEM

Colin Pemberton Ross, London, England, assignor to International Standard Electric Corporation, New York, N. Y.

Application January 25, 1947, Serial No. 724,328
In Great Britain October 24, 1939

Section 1, Public Law 690, August 8, 1946
Patent expires October 24, 1959

5 Claims. (Cl. 178—44)

The present invention relates to electrical volume compression circuits (commonly referred to as "compressors"), to electrical volume expansion circuits (commonly referred to as "expandors"), and to systems including a compressor at the transmitting end and an expandor at the receiving end (such a combination being commonly referred to as a "compandor").

One feature of the invention comprises an electrical volume compression circuit in which compression is effected in two or more stages.

Another feature of the invention comprises an electrical volume expansion circuit in which expansion is effected in two or more stages.

Another feature of the invention comprises an electrical signalling system including a volume compression circuit in which compression is effected in two or more stages, having its output linked with the input of a volume expansion circuit in which expansion is effected in two or more stages.

An electrical volume compression circuit and an electrical volume expansion circuit according to the invention will now be described, by way of example, reference being made to the accompanying drawings, comprising Figs. 1 and 2.

Figure 1:
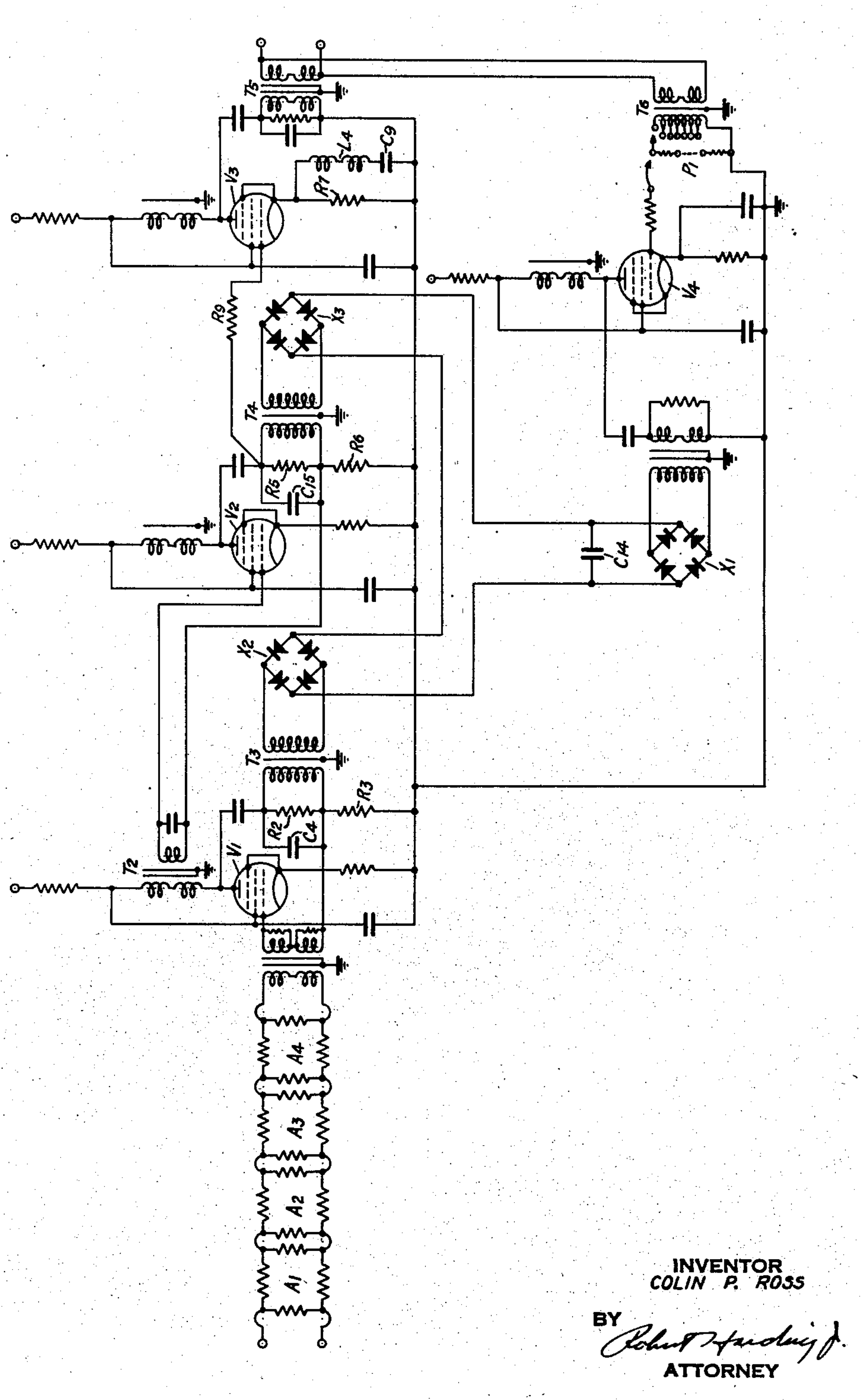

Fig. 1 shows a compressor which consists of a three-stage amplifier comprising three pentode valves V1, V2, V3. Across the output of V3 is bridged a control circuit including a pentode valve V4 and a dry contact rectifier bridge X1. Negative feedback is applied to the first two stages of the amplifier from the control circuit, the amount of this feedback depends upon the input to the control circuit so that the gain of the amplified therefore varies with input level to the amplifier.

In an experimental set-up of this circuit the compression range was 38 db and the compression ratio approximately 1:4.5, so that a 30 db range of input levels is compressed to a 9 db range of output levels. The maximum gain of the amplified was 30 db and the minimum gain was zero.

The work of compression is equally divided between the first and second stages, comprising valves V1 and V2. Each stage thus has a range of 15 db. The two stages work together, that is to say, at any given instant the gain of each stage will have changed by the same amount. The control is effected by using a rectifier bridge as a variable impedance in a negative voltage feedback circuit. In the first stage the feedback circuit comprises transformer T3 and resistance R3. T3 isolates the control current from the feedback circuit, and is also used to step-up the impedance of the variable controlling impedance viz. rectifier bridge X2. In the second stage the feedback circuit is a repetition of that in the first stage, and consists of T4, X3 and R6. The feedback circuits also form the loads for V1 and V2. The circuit may readily be modified to include a further compression stage or stages.

To prevent non-linear distortion, the alternating current signal applied to the rectifiers X2 and X3 by transformers T3 and T4, respectively, should be low compared with the controlling current through them. The level through these first two stages is therefore reduced by attenuation in the attenuator A1 to A4 connected in the input circuit, and the level raised again by the valve V3. Since the output impedance of a controlled stage varies considerably due to voltage negative feedback, the valve V3 also serves to obtain a fixed output impedance for the compressor. In addition, high- and low-frequency equalisation is provided in this third stage to correct small deviations in the frequency characteristic of the complete compandor. A reduction of high-frequency gain is provided by R9, in the input grid circuit of V3, whilst the lower frequencies are raised by the series resonant circuit, L4 and C9, connected in parallel with the feedback circuit provided by the bias resistor R7.

Since the controlling current through the controlling rectifier bridges X2 and X3, is the same, the condition for least non-linear distortion is that there should be equal signal currents through X2 and X3. The first stage is therefore coupled to the second stage through the step-down transformer T2 so that the levels at X2 and X3 are approximately equal at the middle of the compression range; this also keeps the signal-to-noise ratio high, and reduces the amount of anode circuit decoupling necessary in the first stage.

The range is limited as to maximum gain by R2 and R5 shunted across the control circuits; the limit of minimum gain is set by the effective series resistance of T3 and T4. The former are sufficiently small and the latter sufficiently great compared with maximum and minimum rectifier impedances respectively to render negligible the effect of variations between individual rectifiers upon the compression range. Condensers C4 and C15 prevent any tendency towards parasitic oscillation.

The control current is obtained from the output of the compressor via the transformer T6. The speech currents are amplified by V4 and rectified by X1. The resulting control current is smoothed by condenser C14 and then flows through the two control rectifier bridges X2, X3 in series. The value of C14 is such as to give desired operating and hangover times. Coarse sensitivity control is provided by the tappings on T6, while a finer adjustment can be obtained by tappings on potentiometer P1.

Figure 2:
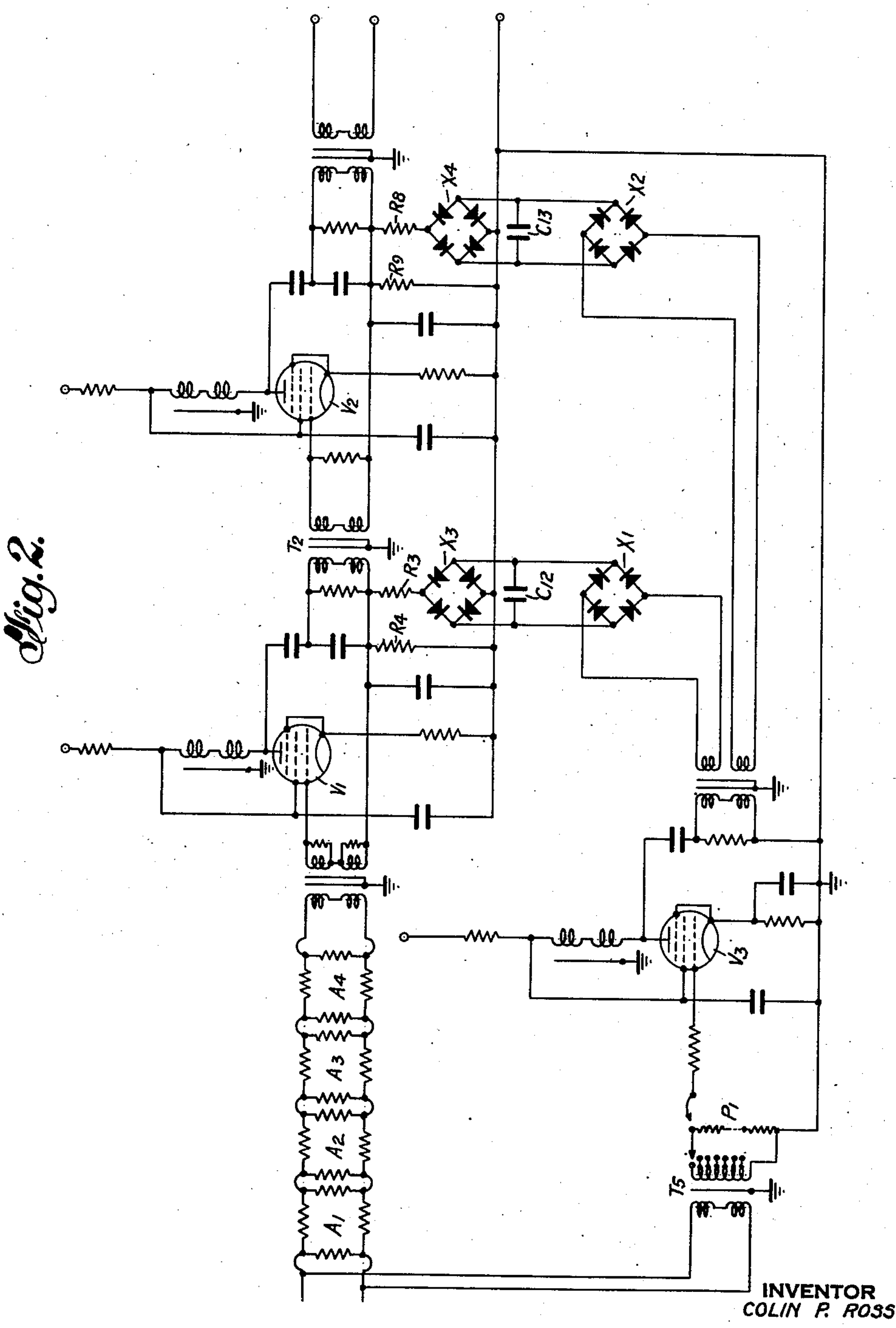

Fig. 2 shows an expandor which consists of a two-stage amplifier across whose input is bridged a control circuit including a pentode valve V3 and rectifier bridges X1, X2. Negative feedback is applied to both amplifier stages to an extent depending on the input to the control circuit. The gain of the amplifier is thus made to vary with input level to the amplifier. The characteristics of the amplifier stages and control circuit are arranged to give the desired expansion characteristic.

In an experimental set-up of this circuit the expansion range was 9 db and the expansion ratio 4:5.1 (i. e. 9 db range of input levels as supplied by the compressor of Fig. 1 was expanded to a 39 db range of output levels). The higher level gain was zero and the maximum loss (i. e. at low input levels) was 30 db.

The work of expansion is equally divided between the first and second stages, V1 and V2, each stage having a range of 15 db. At a given instant the gain of each stage will have changed by the same amount. The control is effected by using a rectifier bridge as a variable impedance in a current feedback circuit, the controlling rectifier bridges X3 and X4 being placed in series with the loads of their respective stages. The circuit may readily be modified to include a further expansion stage or stages.

The maximum loss is determined by resistances R4 and R9, shunted across X3 and X4; the limit of minimum loss is set by resistances R3 and R8 in series with X3 and X4. The shunt resistances R4 and R9 are low compared with the maximum impedance of the rectifier bridges, and the series resistances R3 and R8 are high compared with the minimum impedance of the rectifier bridges. Variations between the maximum and minimum impedances of individual rectifiers do not therefore affect the expansion range of the circuit.

Since the control currents through the rectifiers X3 and X4 are equal, the optimum conditions as regards non-linear distortion are that the signal currents through X3 and X4 should also be equal. The first stage is therefore coupled to the second stage through the step-down transformer T2, so that the levels at X3 and X4 are approximately equal at the middle of the expansion range; this also keeps the signal-to-noise ratio high and reduces the necessary amount of anode circuit decoupling in the first stage.

The control voltage is obtained from the input of the expandor via the transformer T5. This voltage is amplified by valve V3 and rectified by the rectifier bridges X1 and X2. The resulting control currents are smoothed by condensers C12 and C13 respectively before passing through the control rectifier bridges X3 and X4. The capacity of C12 and of C13 is such as to give the desired operating and hangover times.

This arrangement of two separate control current circuits is necessary owing to the fact that one point of each rectifier bridge X3, X4 is connected to earth. It is therefore impossible to feed the two rectifier bridges in series as can be done in the compressor. Sensitivity control is provided by means of taps on transformer T5 and on potentiometer P1, the former giving coarse and the latter fine adjustment.

By using the compressor of Fig. 1 in combination with the expandor of Fig. 2 there is obtained a compandor having a greater variation of gain and a greater compression and expansion ratio than prior compandors. In this way a higher attenuation of noise in the quiet intervals can be obtained. Moreover, since the range of levels in the intermediate circuit between the compressor and the expandor is reduced, low level speech is raised to a higher level relative to the noise than in prior systems. Finally, the fact that the expandor covers a small range of input levels enables the maximum improvement in signal-to-noise ratio to be maintained under very bad noise conditions, while at the same time the intermediate circuit need not be overloaded.

An experimental compandor set-up according to Figs. 1 and 2 has a range of approximately 40 db and a ratio of 4:5:1. The maximum variation of gain is 30 db. The new system will therefore give a maximum improvement of 30 db in signal-to-noise ratio, as against 20 db for the existing system, and this under worse conditions; the maximum improvement may be maintained for signal-to-noise ratios as low as 15 db or even less.

What is claimed is:

1. A volume control arrangement for compressing the gain of an amplifier in accordance with variations in the strength of signals applied to be amplified by said amplifier comprising a plurality of vacuum tubes coupled together and forming a multi-stage amplifier path, negative voltage-feedback paths connected across said tubes, an additional amplifier tube connected across said amplifier path, a first rectifier bridge having a pair of diagonal terminals connected to said additional amplifier tube, a plurality of second rectifier bridges of impedances variable with signal strength and each having a pair of diagonal terminals connected in series with one another, said series connection being coupled across the other pair of diagonal terminals of said first bridge, and a transformer connected in each of said negative voltage-feedback paths, the other pair of diagonal terminals of each of said second bridges being connected across one of said transformers to control the voltage fed back.

2. An arrangement according to claim 1 in which step-down transformers are coupled between the amplifier tubes.

3. An arrangement according to claim 1 in which the additional amplifier tube is connected across the output of the amplifier path.

4. An arrangement according to claim 1 in which a further tube which is free from any feedback control is connected to the output end of said amplifier path.

5. An arrangement according to claim 1 in which shunt and series resistances are connected across and to said rectifier bridges to reduce the effect on the compression range of variations in the maximum and minimum impedances of individual rectifiers.

COLIN PEMBERTON ROSS.

REFERENCES CITED

The following references are of record in the file of this patent:

UNITED STATES PATENTS

| Number | Name | Date |
|---|---|---|
| 1,947,209 | Mathes | Feb. 13, 1934 |
| 2,193,966 | Jones | Mar. 19, 1940 |
| 2,244,695 | Hathaway | June 10, 1941 |
| 2,256,071 | Bruck | Sept. 16, 1941 |
| 2,312,260 | Miller | Feb. 23, 1943 |
| 2,323,634 | Van Slooten | July 6, 1943 |
| 2,432,878 | Frederick | Dec. 16, 1947 |

FOREIGN PATENTS

| Number | Country | Date |
|---|---|---|
| 350,994 | Italy | July 28, 1937 |